Oct. 7, 1952     F. S. WALTERSDORF ET AL     2,613,306
ELECTRICAL WIRING PANEL
Filed Feb. 28, 1949     2 SHEETS—SHEET 1
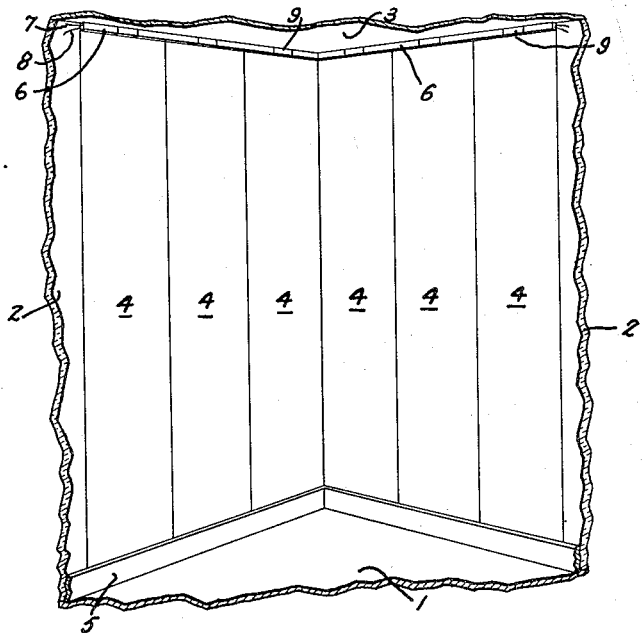
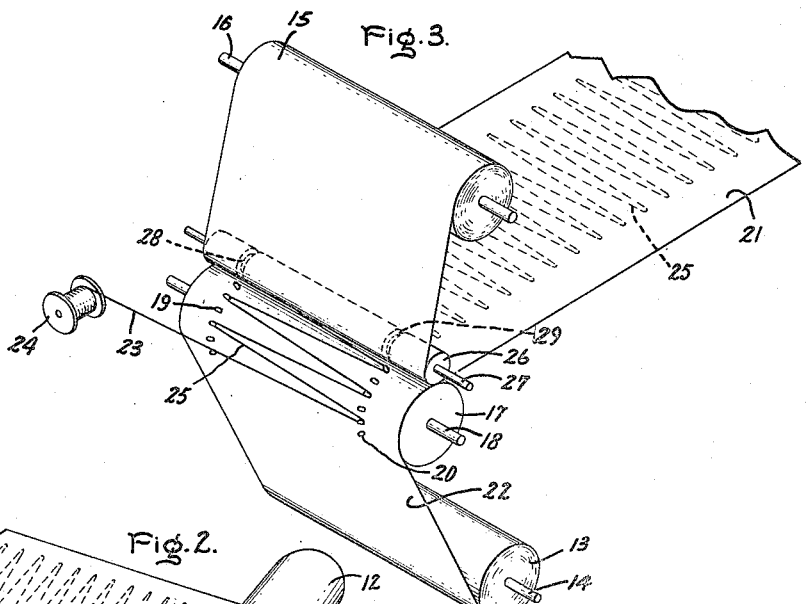
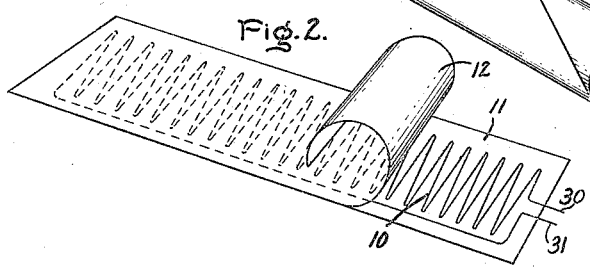
Inventors:
Felix S. Waltersdorf,
Robert W. Scott,
Frank T. Grothouse,
by *[signature]*
Their Attorney.

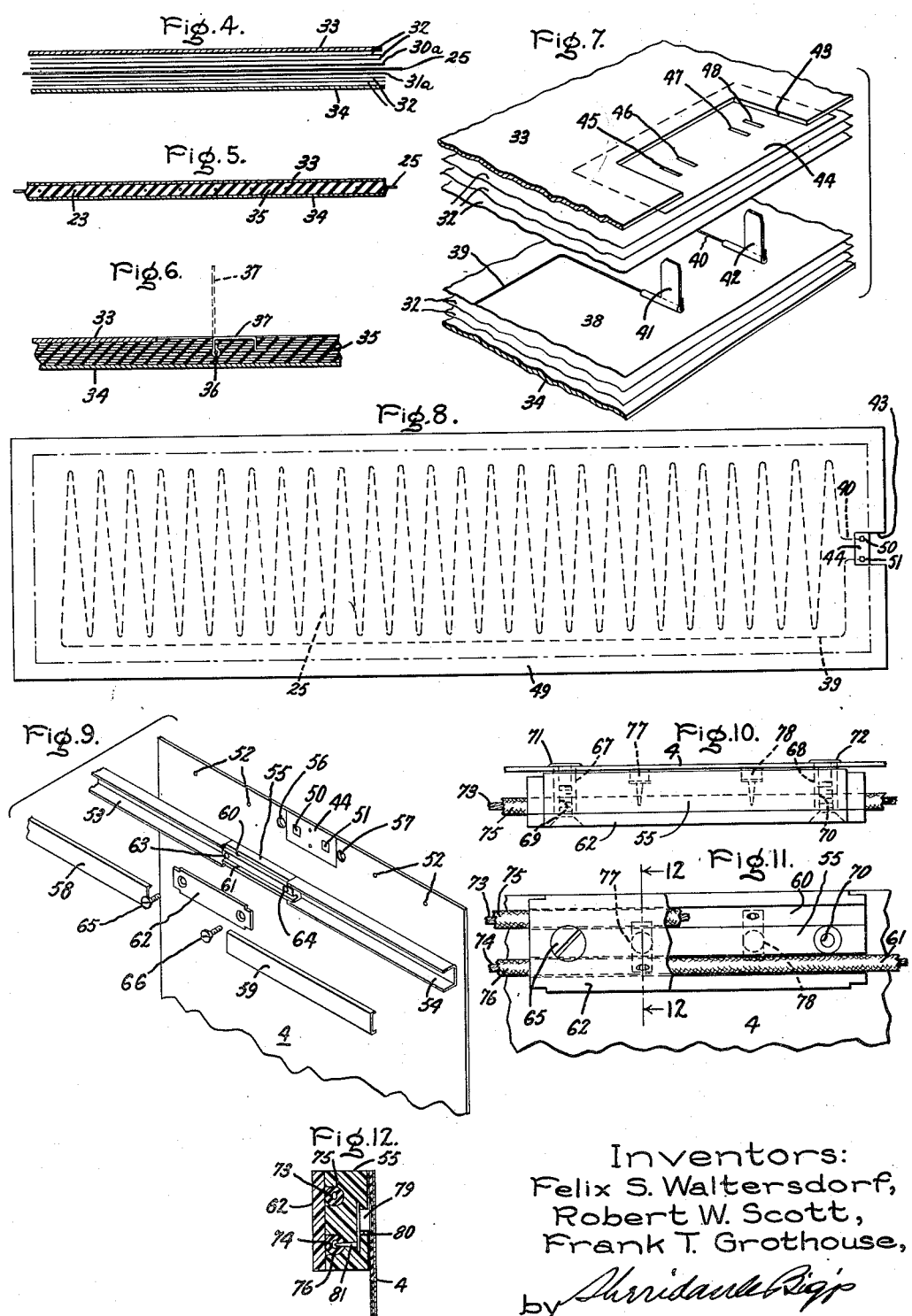

Patented Oct. 7, 1952

2,613,306

UNITED STATES PATENT OFFICE 2,613,306

ELECTRICAL WIRING PANEL

Felix S. Waltersdorf, Bridgeport, and Robert W. Scott, Milford, Conn., and Frank T. Grothouse, South Euclid, Ohio, assignors to General Electric Company, a corporation of New York Application February 28, 1949, Serial No. 78,738

4 Claims. (Cl. 219—19)

Our invention relates to electrical heating devices of the radiant heating panel type.

For heating surfaces and enclosures, a broad field of application and use exists for a heating device in the form of a panel which may be attached to any surface; for such a heating panel which is thin, light, and flexible so that a group of such panels may be readily adaptable to conform to the configuration of the surface to be heated; for a heating panel readily controllable with respect to the rate of heat radiation; and for such a heating panel which has a low thermal mass so that the heat emanating from the panel may be immediately responsive to changes in heating requirements. Accordingly, it is a primary object of our invention to provide a heating panel of the electrical type which is thin and flexible and is readily adaptable to any type of surface, and which has a low thermal mass so that the total heat radiated is readily controllable and immediately responsive to the changing requirements for heating.

Electrical heating panels as disclosed by this invention find many uses such as heaters for de-icing airplane wings, table-top heaters for keeping food warm, for incubators, baby cribs, food warming ovens, and innumerable other applications which we do not attempt to enumerate.

In the art of heating enclosures, it has been demonstrated that a person has the feeling of warmth and comfort if the surrounding surfaces of the enclosure are warm, even though the temperature of the air within the enclosure is relatively cool. An explanation of this is that if the surrounding surfaces, such as the walls, ceiling, and floor are heated, the body of the person then radiates heat at a reduced and controllable rate to the surrounding surfaces so as to impart a feeling of warmth in the person. Moreover, heat radiated from the surrounding surfaces produces a feeling of warmth when it strikes a person even though the intervening air has not been appreciably heated thereby. It is therefore a further object of our invention to provide electrical heating panels particularly suitable for use in houses, offices, or other enclosed spaces.

It is a further object of our invention to provide electrically heated panels having sufficient strength to withstand rough usage, and which are completely moisture resistant.

It is also an object of our invention to provide a new and improved electrical heating panel construction so that a plurality of panels may be employed in any given application, and to provide for the supply of electrical power to each of the panels without detracting from the appearance.

For such electrical heating panels to be commercially feasible, it is important that the cost of production be minimized. This necessitates, in particular, a method of manufacturing so that the panels may be fabricated by machine in a continuous process. Therefore, it is an object of our invention to provide a new and improved heating panel structure, which is particularly adaptable to continuous production.

To this end, the important features of our invention consist in constructing an electrical heater in the form of a thin flexible panel having an electrical resistance element insulated and sealed between outer protective coverings, so that the resultant electrical heater is impervious to moisture, resists physical shock, and is readily adaptable for affixation to a surface. Further, an improved construction is provided for conducting electric power to the panels through a conduit which also serves as a means of anchoring a portion of each panel on a surface.

Our invention will be better understood from the following description taken in connection with the accompanying drawings, and its scope will be pointed out in the appended claims.

Referring to the drawings, Fig. 1 illustrates a cut-away portion of an enclosure, such as a room, showing one embodiment of our invention in which heating panels are installed on the wall portions of the enclosure; Fig. 2 illustrates schematically one step in the production of a heating panel; Fig. 3 illustrates schematically an alternative method for fabricating these electrical heating panels particularly adaptable to production by machine; Fig. 4 is an enlarged cross-sectional view of a portion of a partially completed heating panel; Fig. 5 is a cross-sectional view of a portion of a completed panel; Fig. 6 is an enlarged cross-sectional view of a portion of a completed panel showing a contact strip in position; Fig. 7 is an exploded view of a section of a panel illustrating the construction and method of mounting of the terminal elements on an electrical heating panel; Fig. 8 is a plan view of a completed panel; Fig. 9 is an exploded view of a portion of a panel illustrating a method of mounting the conduit for the power supply leads on the panel; Fig. 10 is a front elevation of the contact block for the panel with the panel in a horizontal plane; Fig. 11 is a view, partially broken away, to illustrate the construction of the contact block shown by Fig. 10; and Fig. 12 is a cross-sectional view taken on the line 12—12 of Fig. 11.

The specific form of the invention shown in the drawings is particularly suitable as a means for radiant heating of an enclosure, such as a home or office. In Fig. 1, there is illustrated a portion of an enclosure having a floor 1, walls 2, and a ceiling 3. A series of electrical heating panels 4, made in accordance with our invention, are mounted on the walls of this enclosure for the radiant heating of the enclosed space. As here shown the panels are installed in abutting relation. However, the panels may also be mounted in spaced relation covering only part of a surface. These heating panels 4 may be secured in place by any suitable method. As shown, a baseboard 5 maintains the lower portion of the panels in proper position, and the upper portion of each panel is held in its proper position by suitable fastening devices extending through a conduit 6 and into the wall as will be explained later. The conduit 6 provides not only a suitable molding between the walls and ceiling of the enclosed space, but also a convenient and concealed space for power supply leads 7 and 8. At appropriately spaced points contact or connection devices 9, are inserted between adjacent sections of the conduit 6, for conducting power from the power supply leads 7 and 8 to the terminals of resistance elements imbedded within panels 4. It will be understood, of course, that many other methods might be employed for attaching or affixing the heating panels to a surface; for example, other methods are to employ a suitable glue or cement between the panel and the surface on which the panel is mounted, or by use of a cement-coated tape which adheres to the panel and the surface on which the panel is mounted.

It is essential in the construction of an electrical heating panel that the resistance element be insulated from the wall to which it is external, and from the outer surface of the panel itself, so that danger of fire or electrical shock is substantially eliminated. Furthermore, the electrical heating element must be secured firmly in position and protected from moisture and physical injury. A form of heating panel constructed in accordance with this invention comprises a plurality of sheets of insulation having an electric heating grid sandwiched between opposed surfaces of the sheets, the sheets and grid being bonded together by a resinous material.

Referring to Fig. 2, one step of a method for producing such an electrical heating panel is shown. In this method, an electrical heating element 10 is arranged in a serpentine form, although other arrangements or configurations of this heating element or grid may be equally suitable. However, to insure a uniform heat over the entire surface of the completed panel, the spacing of the resistance wires should be regular and with no large unheated areas on the panel. We found in one construction that a spacing of one quarter inch between the conductors, measured along the longitudinal center line of the panel, as shown by Fig. 2, produces a panel with uniform heating over the entire surface. Such spacing, of course, may vary depending upon the temperature to which the panel is to be heated, and the heat-transfer characteristics of the material placed on each side of the resistance element.

In accordance with this invention, the heating element or grid is mounted or sandwiched between two sheets of insulating material 11 and 12. In actual practice, the heating grid is first properly oriented on the lower sheet 11. The insulating sheets 11 and 12 may be paper or cloth properly treated for use as insulators, or any other thin flexible material capable of serving as an electrical insulation. These sheets of insulation 11 and 12 are coated or impregnated with a plastic compound. By the term "plastic" is meant any one of the natural or synthetic resinous compounds of the thermo-plastic or thermo-setting type, as well as any one of the natural or synthetic rubbers. To mount and support the heating element 10, therefore, the heating element is placed on the plastic coated insulating sheet 11. Sheet 12 with its plastic coating on its underside, or the side in contact with the heating element, is placed over and in coterminous relation with sheet 11. This assembly is then subjected to heat and pressure so that the heating element 10 is securely bonded between the sheets 11 and 12. If a thermo-plastic bonding material is employed, the bonding takes place, of course, upon cooling of the assembly; however, it may be preferable to employ a thermo-setting resinous compound in an uncured or partially uncured state, so that upon the application of heat and pressure, the final curing of such thermo-setting compound takes place, resulting in the bonding of the heating element between the insulating sheets.

In order to produce these heating panels economically, a continuous process is needed for securing the electrical heating element between the sheets of insulation material. Such a method of continuous fabrication is illustrated by Fig. 3. In accordance with this method, sheets of insulating fabric or paper are supplied from a lower roll 13 mounted on a spindle 14; and from an upper roll 15 rotatable on its spindle 16. The insulating material carried by both the rolls 13 and 16 has a suitable plastic coating on its outer surface. As in the application described in connection with Fig. 2, this plastic coating may be of either thermo-plastic or thermo-setting material. The insulating material from the lower roll 13 is passed over a lower pressure roller 17 which is rotatable on its spindle 18. Roller 17 has two parallel rows 19 and 20 of projecting pins on its cylindrical surface. The tension on completed strip 21 causes the projecting pins 19 and 20 to pierce insulating sheet 22 coming from the lower roll 13, so that a portion of the projecting pins are exposed. A resistance wire 23 coming from spool 24 may then be wound back and forth between these rows of projecting pins 19 and 20 to form a serpentine heating element or grid 25. An upper pressure roller 26, rotatable on a spindle 27 and mounted contiguous to the lower pressure roller 17, contains a pair of grooves 28 and 29 which are aligned with the rows of projecting pins 19 and 20, so that upon rotation of rollers 17 and 26 there is no interference caused by these projecting pins. Any suitable means may then be employed for heating the lower and upper pressure rollers 17 and 26, so that as the two sheets of insulating material with the resistance element therebetween pass between rollers 17 and 26, both heat and pressure are applied, bonding the two sheets of insulating material to each other and to the resistance element 25. While we have illustrated this preferred apparatus for performing this method of fabrication of the sealed heating unit, other forms of apparatus may, of course, be employed to perform the same or similar functions. For example, the resistance wire 23 may be wound about the rows of projecting pins 19 and 20 by hand, or this same function may be accomplished by an automatic mechanical means.

Also the plastic coating may be softened by use of a solvent or by induction heating rather than by heating rollers 17 and 26. The completed strip 21 emanating from between the rollers 17 and 26 is cut into suitable lengths, and terminal leads 30 and 31, such as shown by Fig. 2 are left exposed for connection to a power source.

In accordance with the method illustrated by Fig. 3, the resistance wire 23 is initially held in its proper position by the tension on the wire as it is wound back and forth between the parallel rows of projecting pins 19 and 20. However, as the heating element or grid 25 and the two sheets of insulating material from rolls 13 and 15 come between the upper and lower pressure rollers 17 and 26, the pressure of the rollers will hold the resistance wire in its proper position. If a thermo-setting plastic material is employed as the coating for the two sheets of insulating material, the heat applied to the pressure rollers 17 and 26 is so adjusted, and the speed at which the completed product comes from rolls 17 and 26 is so controlled, that the thermo-setting plastic material sets before the pins are withdrawn. If a thermo-plastic material is employed, the speed of rotation of rollers 17 and 26 and the amount of heat applied are regulated so that the plastic material is softened sufficiently to allow the bonding of the two sheets to each other and to the reistance wire before the projecting pins are withdrawn. It is thus seen that a continuous strip process is provided for the manufacture of a sealed and insulated heating element.

For most applications of heating panels in accordance with this invention, additional insulation and a more or less rigid outer covering are required, although the completed product as illustrated by Figs. 2 and 3 may be suitable for certain applications. Fig. 4 illustrates a panel constructed in accordance with a preferred embodiment of our invention. Referring to Fig. 4, the resistance wire comprising the heating element for the panel is shown at 25, and the two sheets of plastic coated insulating material bonded to each side of the heating element are shown at 30a and 31a. The method of manufacture of this portion of the completed panel has been described above in connection with Figs. 2 and 3. In the embodiment shown in Fig. 4, additional sheets of insulating material 32 have been added. Insulating material 32 may be of any suitable type, such as paper impregnated with a suitable insulating compound. To provide the requisite strength and to protect the heating element from physical damage, outer protective coverings 33 and 34, preferably of metal, are employed.

After all of the constituent elements have been assembled, the assembly preferably is placed in a press, and heat and pressure are applied to bond firmly all the constituent elements into a unitary panel. A cross-sectional view of the finished product is shown by Fig. 5 illustrating that resistance wires 25 are firmly imbedded in a homogenous mass of insulation 35 which in turn is sealed between the outer protective coverings 33 and 34. The outer protective coverings may be of any suitable thermally conductive material; however, we have found that the maximum strength and protection is provided for the panel by using a metallic layer for this covering. Thin sheets of aluminum form a highly satisfactory protective covering, since aluminum is light, strong, and free from corrosive effects, provides a covering which readily transmits the heat from the heating element, and permits both surfaces of the panel to be electrically grounded.

In the various applications for such radiant heating panels, it is desirable to avoid unsightly projections and terminal structures. To this end, we provide a terminal structure for each panel, with each terminal or contact member for conducting electrical power to the panel heating element substantially flush or coplanar with the surface of the panel. Fig. 6 illustrates this construction of a completed electrical heating panel having outer protective coverings 33 and 34, a mass of insulating material 35, a lead 36 coming from the electrical heating element, and a contact strip 37 connected to this lead. The details of this construction will be more clearly understood by a reference to Fig. 7, showing the outer protective coverings 33 and 34, the assembly 38 of the heating element bonded between sheets of insulating material, and the additional sheets of insulating material 32. In fabricating the heating element between the two sheets of insulation, leads of an appropriate length 39 and 40 extend from the heating element and lie outside of the bonded sheets of insulation material covering the heating element. Contact strips or terminals 41 and 42, of aluminum, copper, or other suitable electrical conducting material, are secured to the ends of the leads 39 and 40. Initially these terminals 41 and 42 are substantially L-shaped. One portion of the terminal is then rolled around its associated lead, and pressure is applied so that the terminal is permanently attached to the lead. In addition to or in lieu of rolling this contact strip around the lead and applying pressure, solder may be employed to insure a permanent contact and connection between the lead and its terminal.

A portion of one of the outer protective coverings 33 is cut out, as shown at 43, in order to provide a space on the surface of the panel for the two panel terminals. A dielectric plate 44 is provided as a mounting block for the terminals. The dielectric plate 44 is of fabric or heavy impregnated paper, and it may be cut the same size as the cut-out portion 43; or as shown in Fig. 7, the dielectric member 44 may be slightly larger than the cut-out portion 43 so that it is anchored in position by the outer covering 33. A slot 45 is provided in dielectric member 44 through which the terminal 41 may project. Similar slots are provided, of course, in the additional sheets of insulation 32. In assembly the terminal 41 is forced through this slot 45, and then while pressure is applied to the assembled panel, the terminal 41 is bent over. The free end of terminal 41 is then forced downwardly through a slot 46. Likewise terminal 42 is forced through a slot 47 and similar slots in the additional sheets of insulation 32, and as pressure is applied the strip 42 is bent over and its free end is forced downwardly through a slot 48. Finally, when heat and pressure are applied to the assembled panel, dielectric member 44 is sealed in position with the terminals 41 and 42 approximately flush with the surface of the panel. The completed panel will appear as shown in Fig. 6 with the terminal 37 attached to the lead 36 from the electrical heating element, and with the terminal bent over and forced downwardly into the insulation; and after the heat and pressure have been applied, this terminal 37 is firmly anchored with only a flat contact surface exposed. In Fig. 8 a completed panel 49 is shown with the heating element 25 sealed in position, and connected by leads 39 and 40 to contacts 50 and 51 mounted on an insulating plate 44 which is secured within a cut-out portion 43 of the protective covering of the panel.

By employing surface contacts 50 and 51, the installation and connection of the power supply to the panels is facilitated. Figs. 9 through 12 illustrate a preferred arrangement for supplying power to the panels, the arrangement shown being the invention of Clarence Frere and being disclosed and claimed in his application, Serial No. 195,845, filed November 15, 1950, and assigned to the same assignee as the instant application. As described in connection with Fig. 1, the power supply means for a group of installed panels appers only as a molding. As shown in Fig. 9, the panel 4 is provided with a series of apertures 52 and corresponding apertures are provided in conduit bases 53 and 54 so that by means of any suitable fastening devices, such as screw-threaded means or rivets, the conduit bases may be attached firmly to the panel. The conduit bases are thus electrically connected to the panel surfaces so that by grounding the conduit bases, the panel surfaces are also grounded. The same fastening devices may serve also to attach the panel to a wall or other surface. A terminal block or contact making device 55 is employed which overlies the insulating plate 44 and contacts 50 and 51. Aligning apertures 56 and 57 are provided on the panel 4, and cooperating projections on the back side of the terminal block 55, as shown by Fig. 10, are engaged in these apertures 56 and 57 to hold the terminal block accurately in position. Conduit covers 58 and 59 are designed so that they engage the conduit bases 53 and 54 with a press fit to cover the conduit bases and the terminal block. Both the base and the cover for each of these conduits are made preferably of steel, so that the natural resiliency of these parts will hold them together. The dimensions of terminal block 55 are so proportioned with respect to the dimensions of the conduit bases 53 and 54, that the conduit bases fit over the terminal block with a force fit. The power supply leads lie within the conduit, and the terminal block 55 is provided with parallel recesses 60 and 61 for the reception of these power leads. A cover 62 is removably secured to terminal block 55 to retain the conductors of the electrical supply line in position, and this cover serves the additional function of permitting ready inspection of the power leads and their connections. Threaded bores 63 and 64 are provided in terminal block 55 so that screws 65 and 66 may be passed through cover 62 and threaded into these bores 63 and 64 to hold cover 62 in position.

In Fig. 10 the contact making device is shown assembled with a panel, and Figs. 11 and 12 show further details. To accurately position this device with respect to the panel, and to provide a means for attaching the cover 62 to the body member 55, tubular members 67 and 68 are mounted in and form a part of body member 55. Each of these tubular members 67 and 68 includes a threaded portion as at 69 and 70, and it is this portion of each tubular member which results in the threaded bores 63 and 64. In addition, tubular members 67 and 68 each have a slightly flared portion 71 and 72, so that once the terminal block is mounted on the panel it will be held in its proper position. The leads for conducting power to the panel comprise the conductors 73 and 74 covered by insulation 75 and 76. With the cover 62 removed, the power supply leads may be positioned within the parallel grooves or recesses 60 and 61 of the body member 55. The body member 55 has integrally formed therein pin members 77 and 78, corresponding respectively with recesses 61 and 60 for the conductors of the electrical supply line. Each pin member has a contact portion 79 which makes contact with the corresponding terminal 50 or 51 on the heating panel; and each contact portion 79 is connected by a strip 80 to a spike 81. Spikes 81 pierce the insulation 75 and 76 on the power supply conductors to complete the electrical circuit from the electrical supply line to the heating element in the panel. Thus, to establish this connection it is only necessary to mount the contact making device in its proper position on the panel and lay the conductors within the recesses 60 and 61. When the terminal block cover is placed in position and the screw-threaded fasteners are tightened down, the power supply conductors will be forced against the spikes 81 resulting in the connection to the heating element of the panel. Body member 55 of the contact making device may be made of any suitable insulating material, preferably a molded phenolic condensation product, such as Bakelite. Tubular members 67 and 68, of a metal such as brass or steel, may be positioned in member 55 during the molding operation. Likewise the pin members 77 and 78, of electrical conducting material are mounted in member 55. The strips 80 which connect spikes 81 to contacts 79 in the contact making device may be of copper or other electrical conducting material, or of a conducting metal which will fuse and break the electrical circuit to the heating panel in case of overload or short circuit. It will thus be seen that an arrangement is provided for supplying power to each panel which is convenient to install and is of pleasing appearance, while insuring a positive contact between the power supply leads and the heating panel.

While no arrangement has been shown for controlling the power supply to the installed panels through leads 7 and 8, it will be understood that normally some type of heat responsive controller will be installed between the main electrical power source and leads 7 and 8, such as a thermostatically controlled contactor. No complicated mechanism for this control is required since a simple switching mechanism may be employed to open and close the circuit to the panels and thus regulate the heat output. By reason of the fact that the thermal mass of the panels, in accordance with this invention, has been reduced to a practical minimum, the heat emanating from the panels will be quickly responsive to a controlling thermostat.

While we have shown particular embodiments of the various phases of our invention, it will be understood, of course, that we do not wish to be limited solely thereto since modifications may be made, and we, therefore, contemplate by the appended claims to cover any such modifications as fall within the true spirit and scope of our invention.

What we claim as new and desire to secure by Letters Patent of the United States is:

1. An electric heating panel comprising a plurality of sheets of insulating material, a grid of resistance wire positioned between opposed surfaces of said sheets, thermally conductive layers positioned on the other surfaces of said sheets, said sheets and said layers being bonded together by a plastic material, one of said layers having a cut-out portion therein, said wire having a pair of terminals located in said portion, a dielectric member for supporting said terminals in spaced relation and positioned in said cut-out portion, said dielectric member and said terminals having outer surfaces substantially coplanar with the outer surface of said one layer.

2. An electric heating panel comprising a plurality of sheets of insulating material, a grid of resistance wire positioned between opposed surfaces of said sheets, metallic layers positioned on the other surfaces of said sheets, said sheets and said layers being bonded together by a plastic material, one of said layers having a cut-out portion therein, said wire having a pair of terminals located in said portion, a dielectric member positioned in said cut-out portion for supporting said terminals, said dielectric member and said terminals having outer surfaces substantially coplanar with the outer surface of said one layer.

3. A heating panel comprising a plurality of sheets of insulating material, an electrical heating grid positioned between opposed surfaces of said sheets, means for bonding said grid between said sheets of insulating material, thermally conductive layers affixed to the other surfaces of said sheets, one of said layers having a cut-out portion therein, said grid having a pair of terminals located in said portion, a dielectric member positioned in said cut-out portion, said terminals being supported in said dielectric member with the outer surfaces of said terminals substantially coplanar with the outer surface of said one layer.

4. In an electric heating panel of the type having a heating grid sealed between insulating and protective layers with terminal leads extending from the grid between two of the layers, a contact structure adapted to be connected to the terminal leads for supplying electrical power to the grids, said contact structure comprising a flat strip of electrical conducting material connected to each terminal lead, a dielectric plate having a pair of spaced slots for each strip, each strip extending outwardly from the panel through one of its corresponding pair of slots and inwardly toward the panel through said other slot, whereby a portion of each strip extends across the surface of said plate, and means bonding said plate to an outer layer of the panel.

FELIX S. WALTERSDORF.
ROBERT W. SCOTT.
FRANK T. GROTHOUSE.

REFERENCES CITED

The following references are of record in the file of this patent:

UNITED STATES PATENTS

| Number | Name | Date |
| --- | --- | --- |
| 761,204 | Carpenter | May 31, 1904 |
| 1,144,224 | Mills | June 22, 1915 |
| 1,376,987 | Wirt | May 3, 1921 |
| 1,514,618 | Ide | Nov. 11, 1924 |
| 1,521,241 | Hale | Dec. 30, 1924 |
| 1,597,257 | White | Aug. 24, 1926 |
| 2,025,540 | Langley | Dec. 24, 1935 |
| 2,293,596 | Del Camp | Aug. 18, 1942 |
| 2,301,288 | Knauf, Jr., et al. | Nov. 10, 1942 |
| 2,314,766 | Bull et al. | Mar. 23, 1943 |
| 2,314,855 | Del Camp | Mar. 23, 1943 |
| 2,408,045 | Cottrell | Sept. 24, 1946 |
| 2,419,652 | McLarn | Apr. 29, 1947 |
| 2,445,587 | Sims | July 20, 1948 |
| 2,502,148 | Grothouse | Mar. 28, 1950 |
| 2,512,875 | Reynolds | June 27, 1950 |

FOREIGN PATENTS

| Number | Country | Date |
| --- | --- | --- |
| 224,648 | Great Britain | Nov. 20, 1924 |
| 384,382 | Great Britain | Dec. 8, 1932 |
| 393,304 | Great Britain | June 1, 1933 |
| 469,744 | Great Britain | July 30, 1937 |